United States Patent Office 3,461,118
Patented Aug. 12, 1969

3,461,118
3β-TETRAHYDROFURANYLOXY- AND 3β-TETRA-HYDROPYRANYLOXYESTRA - 4,9(10) - DIENES AND -4,9(10),11-TRIENES, THEIR PREPARATION AND INTERMEDIATES THEREOF
John A. Edwards, Palo Alto, Calif., assignor to Syntex Corporation, Panama, Panama, a corporation of Panama
No Drawing. Continuation-in-part of application Ser. No. 528,363, Feb. 18, 1966. This application Oct. 17, 1966, Ser. No. 591,371
Int. Cl. C07c *173/00;* A61k *17/00*
U.S. Cl. 260—239.55                   16 Claims

ABSTRACT OF THE DISCLOSURE

Novel 3β-tetrahydrofuranyl and 3β-tetrahydropyranyl ethers of $\Delta^{4,9(10)}$-diene and $\Delta^{4,9(10),11}$-triene steroids of the estrane series containing optional substitution at positions C-7, C-17β, C-17α, and C-18 which compounds are anabolic and progestational agents and processes for the preparation of such compounds.

This is a continuation-in-part of Ser. No. 528,363, filed Feb. 18, 1966 now abandoned.

This invention relates generally to novel and useful steroids and to processes for their preparation. This invention particularly pertains to 3β-tetrahydrofuranyl and 3β-tetrahydropyranyl ethers of estrapolyenes, to novel and valuable intermediates therefor, and to processes for their preparation.

Among the novel compounds of the present invention are those represented by the following formulas:

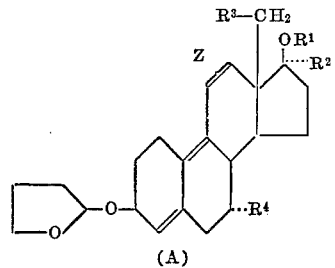

(A)

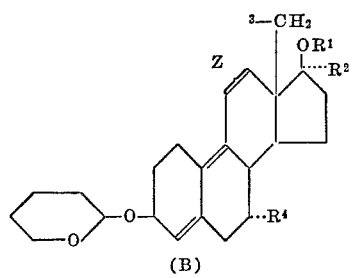

(B)

wherein, in each formula,

R¹ represents hydrogen, tetrahydrofuran-2-yl, tetrahydropyran-2-yl, or a hydrocarbon carboxylic acyl group containing less than 12 carbon atoms;
R² represents hydrogen, cyclopropyl, (lower)alkyl, (lower)alkenyl, (lower)alkynyl, or halo(lower)alkynyl;
R³ represents hydrogen or methyl;
R⁴ represents hydrogen or methyl; and
Z represents a carbon-carbon single bond or a carbon-carbon double bond.

By the term "(lower)alkyl" and derivations thereof, such as "(lower)alkenyl," "(lower)alkynyl," and "halo (lower)alkynyl" is meant a monovalent, branched- or straight-chain aliphatic radical, containing six or less carbon atoms. Thus, typical members of such (lower)alkyl groups are methyl, ethyl, propyl, butyl, pentyl, and hexyl; of such (lower)alkenyl groups are vinyl, propenyl, and the like; of such (lower)alkynyl groups are ethynyl, propynyl, and the like; and of such halo(lower) alkynyl groups are chloroethylnyl, chloropropynyl, and the like.

The hydrocarbon carboxylic acyl groups of this invention will contain less than twelve carbon atoms and may be of a straight, branched, cyclic or cyclic-aliphatic chain structure. They may be saturated, unsaturated, or aromatic and optionally substituted by functional groups, such as hydroxy, nitro, amino, halogen, and the like. Typical esters thus include acetate, propionate, trimethylacetate, aminoacetate, haloacetate, benzoate, adamantoate, and the like.

The tetrahydrofuranyl and tetrahydropyranyl ether groupings are linked to the parent steroid nucleus at a carbon atom of the ether grouping adjacent the oxa function thereof. Thus contemplated herein are the tetrahydrofuran-2-yl and tetrahydropyran-2-yl ethers.

The novel steroids represented by the above Formulas A and B are anabolic agents and are thus effective in the treatment of debilatory conditions, such as are encountered in geriatrics, post-surgical recuperation, and the like. Those compounds of the above formulas in which R² is (lower)alkynyl and halo(lower)alkynyl, particularly ethynyl and chloroethynyl are orally active progestational agents, useful in the control and regulation of fertility and in the treatment of various menstrual disorders.

These compounds are administered via any of the commonly employed techniques, such as in the form of pharmaceutically acceptable non-toxic solutions, suspensions, tablets, capsules, and the like, including parenteral and, notably, oral administrations. Dosage levels vary, generally depending upon the subject being treated, but range in a daily dosage of from about 0.1 mg. to 10 mg. per kilogram body weight. These compounds can also be combined with various other therapeutic agents.

Another class of compounds which demonstrates similar utility is that represented by Formulas A and B above wherein R⁴ is the grouping —CHXY in which X represents hydrogen, chloro, or fluoro and Y represents chloro or fluoro.

These novel compounds hereof are prepared in accordance herewith from intermediate compounds represented by Formula IX:

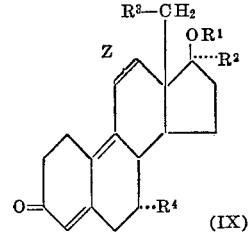

(IX)

wherein each of R¹, R², R³, R⁴, and Z are as previously described, upon reduction of the 3-keto group, such as with lithium aluminium hydride, sodium borohydride, and the like, in organic solution followed by etherification of the resultant allylic hydroxyl group with dihydrofuran and dihydropyran, respectively, optionally in an inert organic solvent, such as benzene, diethyl ether, and the like, and in the presence of a catalytic amount of any stable sulfonyl chloride, preferably, p-toluenesulfonyl chloride, benzenesulfonyl chloride, methanesulfonyl chloride, p-nitrobenzenesulfonyl chloride, and the like to respectively provide the 3β-tetrahydrofuranyl and -tetrahydropyranyl moieties.

Those compounds represented immediately above (Formula IX) in which R⁴ is methyl are particularly valuable steroids, for in addition to their usefulness as intermediates, they also exhibit anabolic and progestational activities. These compounds are represented by Formula C:

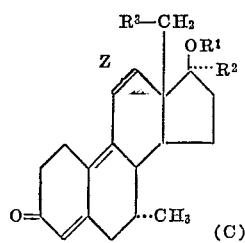

(C)

wherein each of R¹, R², R³, and Z are as hereinbefore defined.

Another useful group of progestational compounds represented immediately above (Formula IX) are those represented by Formulas D and E as follows:

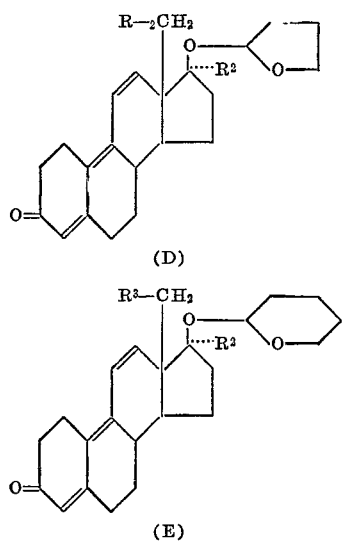

wherein, in each formula, R² is hydrogen, methyl, ethynyl, and chloroethynyl and R³ is hydrogen or methyl.

The intermediate compounds thus dipicted (IX) are prepared by a sequence of steps from estr-4-en-17β-ol-3-one or 18-methylester-4-en-17β-ol-3-one. The 7α-methyl group may be introduced by alkylation of a 3-keto-Δ⁴,⁶-diene with methyl magnesium bromide in the presence of cuprous chloride. The 7α-halomethyl group is introduced by treating the 3-keto-Δ⁴,⁶-diene with a molar excess of an alkali or alkaline earth metal salt of a haloacid, such as trichloroacetic acid, chlorodifluoroacetic acid, dichloroacetic acid, and the like in inert, nonaqueous solvent at temperatures above the decomposition temperature of the particular salt employed. A dihalocyclopropyl group is thereby fused across the conjugate double bond between C-6 and C-7 which is most remote to the keto group. Thereafter, the 6,7-fused halocyclopropyl group is treated in liquid medium at from about 25° C. to about 150° C. with reagents which effect ring opening of the fused cyclopropyl ring, such as zinc dust in acetic acid, to give the corresponding 7-halomethyl compound. For these purposes, the 3-keto-Δ⁴,⁶-diene system is provided via conventional means, such as by treating the 3-keto-Δ⁴,⁶-ene with chloranil in the presence of ethyl acetate and acetic acid. Thereafter, oxidation of the 17β-hydroxy group, such as with chromic acid in acetone gives the 3,17-diones represented by Formula I below.

The double bond may be inserted between carbons 9 and 10 according to the following scheme:

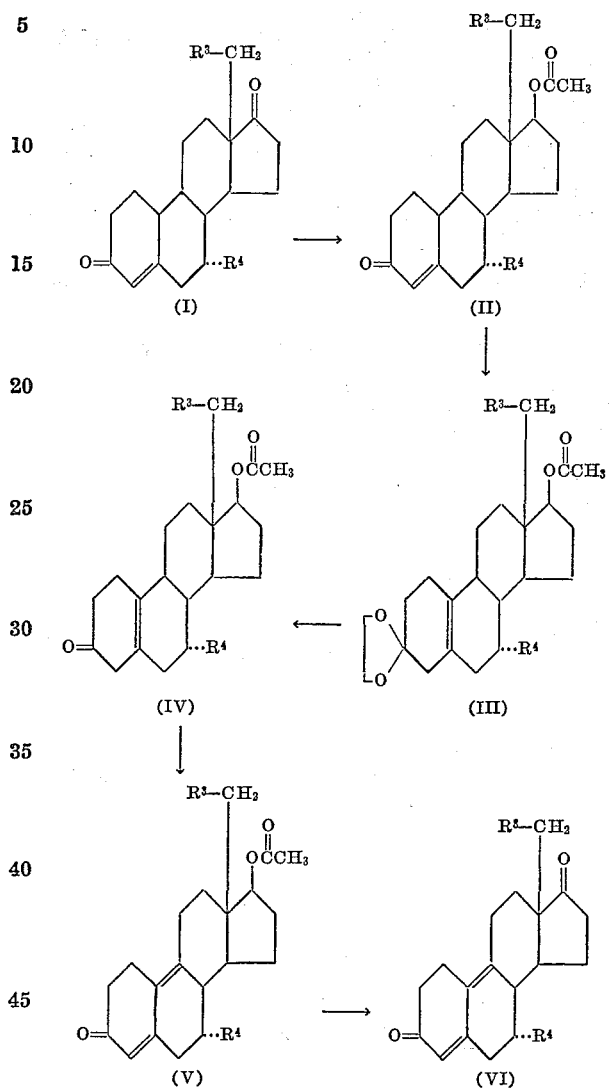

Referring to the scheme set forth above, starting steroids (I) are provided as previously described above. The 17β-acetoxy group on (II) is provided by protection of the 3-keto, such as by forming the corresponding enol ether with ethylorthoformate followed by reduction of the 17-keto, such as with sodium borohydride and esterification of the resultant secondary hydroxyl with acetic anhydride in pyridine. The 3-keto protecting group is then removed by hydrolysis with acid, giving compound (II).

Treatment of the 3-keto-4-ene (II) with ethylene glycol in the presence of p-toluenesulfonic acid or other strong acid produces the 3-ketal-5(10)-ene (III) with trace amounts of the corresponding Δ⁵⁽⁶⁾-olefin which may be readily separated from the principal product via chromatography. The 3-ketal group is then removed such as by treatment with magnesium sulfate in benzene to give (IV).

The 3-keto-5(10)-ene thus obtained is treated such as with bromine in pyridine solution and pyridine perbromide hydrobromide to yield the 4,9(10)-diene (V). Thereafter, the 17β-acetoxy group is removed by hydrolysis with base and oxidized with chromic trioxide to the corresponding 17-keto group (VI).

The introduction of a third site of unsaturation between at C-9 and C-11, if desired, is preferably accomplished as indicated by the following scheme:

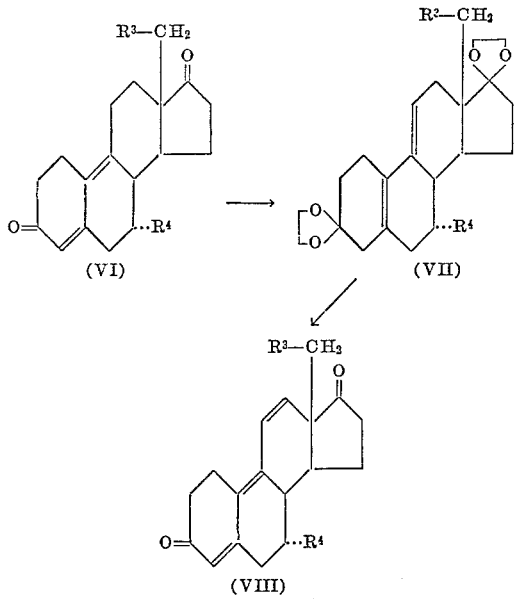

with each of $R^3$ and $R^4$ being as defined above. In this process the $\Delta^{4,9(10)}$-diene-3,17-dione (VI) (prepared as described above) is treated with ethylene glycol in the presence of acid catalyst, such as p-toluenesulfonic acid to give the corresponding diketal with rearranged unsaturation (VII).

Thereafter, the diketal (VII) thus produced is epoxidized with a peroxyacid, for example, peracetic, perbenzoic, m-chloroperbenzoic, monoperphthalic acid, and the like. The reaction product, consisting of a mixture of 5,10- and 9,11-epoxide derivatives, is then hydrolyzed with acid, such as p-toluenesulfonic acid, p-nitrobenzenesulfonic acid, and the like in the presence of acetone or other ketone, such as ethyl methyl ketone effecting epoxide cleavage with generation of the corresponding hydroxy derivatives. The reaction product thus obtained is finally treated with strong acid, such as mineral acid, for example, perchloric acid, sulfuric acid, hydrochloric acid, or other suitable strong acid in organic solvent, for example, dioxane, benzene, toluene, xylene, tetrahydrofuran, diglyme, acetic acid, formic acid, or like solvents to effect dehydration, thus providing the $\Delta^{4,9(10),11}$-triene-3,17-dione (VIII). Alternatively, the epoxidation reaction mixture is treated with strong acid, such as mineral acid as described above to give hydrolysis accompanied by concomitant dehydration, thus directly affording the final product (VIII). Yet another method by which the final product (VIII) is produced involves treating the diketal (VII), produced as described above, with about one molar equivalent of osmium tetroxide in organic solvent, such as benzene and toluene, followed by dehydration with strong acid as described above.

The just described process by which the triene system is introduced also has value in the preparation of various 3-keto-19-norpregna-4,9(10),11-trienes. This process thus serves as a novel and useful proces for the introduction of the $\Delta^{4,9(10),11}$-triene functional system in the steroid nucleus.

Another method by which the $\Delta^{4,9(10),11}$-triene system can be introduced involves forming a 3,3-dimethoxy ketal with rearranged unsaturation of compound (V), represented above, by treatment with methanol acidified with hydrogen chloride. Restoration of the 3-keto group while retaining the $\Delta^{5(10),9(11)}$-unsaturated system is then performed, such as by treatment with an 8 percent sulfuric acid:acetone solution at room temperature. The resultant steroid is converted to the $\Delta^{4,9(10)}$-dien-11-ol by contact with an oxidizing atmosphere in a basic solution, such as is provided by pyridine, quinoline, and the like, followed by the action of an alkali metal iodide, e.g., sodium iodide. The double bond between carbons 11 and 12 is then introduced by a dehydration process with methanesulfonyl chloride and pyridine in dimethylformamide giving the corresponding $\Delta^{4,9(10),11}$-triene. Thereafter, the 17β-acetoxy group is converted to a keto group as described above giving a $\Delta^{4,9(10),11}$-triene-3,17-dione identical to compound (VIII) represented above. This latter process is illustrated by the following equation:

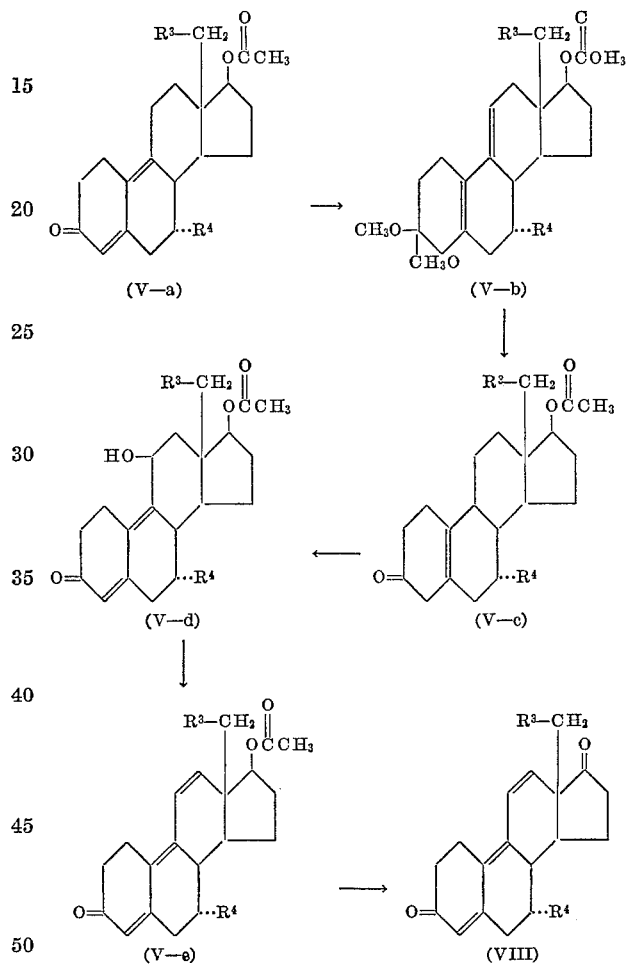

After the $\Delta^{4,9(10)}$-diene and $\Delta^{4,9(10),11}$-triene systems have been respectively introduced the steroids can be further elaborated at C-17. Before such C-17 elaboration, the 3-keto group is selectively protected, such as by forming the corresponding 3-ketal by treatment with ethylene glycol in the presence of weak acid, such as oxalic acid. Alternatively, the corresponding oxime may be prepared as through treatment of the 3-keto with hydroxylamine hydrochloride or one may utilize the corresponding enol ether obtained upon treatment with ethylorthoformate in the presence of p-toluenesulfonic acid.

The 17-keto may then be treated with an organometallic reagent, such as alkyl lithium, alkenyl lithium, alkynyl lithium, or alkyl magnesium halide, alkenyl magnesium halide, or alkynyl magnesium halide which provides the corresponding 17α-aliphatic 17β-ols. The 17α-alkyl or alkenyl groups, such as ethyl and vinyl may be alternatively provided through controlled hydrogeneration of the 17α-alkynyl group, such as ethynyl. The 17α-vinyl may in turn be converted to 17α-cyclopropyl upon treatment with an iodomethyl metal iodide, such as is provided by the combination of methylene iodide and zinc-copper metal couple.

In lieu of the process described above, the 17-keto may be reduced, such as by treatment with sodium borohydride in methanol or lithium aluminum hydride in tetrahydrofuran to give the corresponding 17β-hydroxy compound, unsubstituted in the 17α-hydroxy compound, unsubstituted in the 17α-position.

The secondary 17β-hydroxyl group may be esterified by an acylating agent, such as acetic anhydride in pyridine. Esterification of the tertiary 17β-hydroxy group is done with an acylating agent, such as acetic anhydride in acetic acid in the presence of an acid catalyst, such as p-toluenesulfonic acid and the like. Etherification of the 17β-hydroxyl with dihydropyran in the presence of p-toluenesulfonic acid affords the 17β-tetrahydropyranyl ether.

The protecting group at C-3 is removed in the usual manner, such as by acidic treatment to afford the corresponding 3-keto compound, fully substituted at C-17 as provided above. Thus, provided are the intermediate compounds depicted hereinabove by Formula IX.

Thereafter and in accordance with the practice of this invention as described hereinbefore, the 3β-tetrahydrofuran-2'-yloxy compounds and 3β-tetrahydropyran-2'-yloxy compounds, represented hereinabove by Formulas A and B, are obtained upon reduction of the 3-keto group and subsequent etherification of the resultant allylic 3β-hydroxyl.

The foregoing description and the following examples serve to illustrate the manner by which this invention may be practiced but are not to be construed as limitative except insofar as indicated by the appended claims.

Example 1

To a suspension of 1 g. of 7α-methylestr-4-ene-3,17-dione in 7.5 ml. of anhydrous, peroxide-free dioxane are added 1.2 ml. of freshly distilled ethyl orthoformate and 0.8 g. of p-toluenesulfonic acid. The mixture is stirred at room temperature for 30 minutes. There is then added 0.8 ml. of pyridine, followed by water until solidification occurs. This solid is collected by filtration, washed with water and air dried to yield 3-ethoxy-7α-methylestra-3,5(6)-dien-17-one which is recrystallized from acetone:hexane.

A solution of 1 g. of sodium borohydride in 3 ml. of water is added to an ice-cooled solution of 1 g. of 3-ethoxy-7α-methylestra-3,5(6)-dien-17-one in 120 ml. of methanol and the mixture is then allowed to stand for 16 hours at room temperature. The excess reagent is decomposed by addition of acetic acid and the solution is then concentrated to small volume in vacuo and diluted with water. The product is extracted with ethyl acetate and these extracts are washed with water, dried and evaporated to yield 3-ethoxy-7α-methylestra-3,5(6)-dien-17β-ol which may be further purified by recrystallization from acetone:hexane.

A mixture of 1 g. of 3-ethoxy-7α-methylestra-3,5(6)-dien-17β-ol, 4 ml. of pyridine, and 2 ml. of acetic anhydride is allowed to stand at room temperature for 15 hours. The mixture is then poured into ice water and dried to yield 3-ethoxy-7α-methyl-17α-acetoxyestra-3,5(6)-diene which may be further purified through recrystallization from acetone:hexane.

To a solution of 1 g. of 3-ethoxy-7α-methyl-17β-acetoxyestra-3,5(6)-diene in 10 ml. of acetone are added a few drops of 36% hydrochloric acid. The mixture is heated a few minutes at steam bath temperatures, diluted with water and filtered. The solid thus collected is dried and recrystallized from acetone:hexane to yield 7α-methyl-17β-acetoxyestr-4-en-3-one.

Example 2

A mixture of 1 g. of 7α-methyl-17β-acetoxyestr-4-en-3-one, 25 ml. of dry benzene, 5 ml. of ethylene glycol, and 50 mg. of p-toluenesulfonic acid monohydrate is refluxed for 16 hours using a water separator. The reaction mixture is then washed with aqueous sodium bicarbonate solution and water, dried and evaporated to dryness. The resultant residue is chromatographed on alumina eluting with hexane:benzene and pure benzene to yield 3,3-ethylenedioxy-7α-methyl-17β-acetoxyestr-5(10)-ene which is recrystallized from acetone:hexane.

Example 3

To a solution of 1.0 g. of 3,3-ethylenedioxy-7α-methyl-17β-acetoxyestr-5(10)-ene in 50 ml. of benzene is added 0.2 g. of magnesium sulfate. The mixture is heated at reflux for 40 minutes, neutralized with a saturated aqueous sodium carbonate solution, concentrated under reduced pressure to about 20 ml., and poured into water. The solid which forms is collected by filtration, washed well with water, and dried to yield 7α-methyl-17β-acetoxyestr-5(10)-en-3-one which may be recrystallized from acetone.

Example 4

To a solution of 0.2 g. of 7α-methyl-17β-acetoxyestr-5(10)-en-3-one in 4 ml. of pyridine is added 1.1 g. of pyridine perbromide hydrobromide. The mixture is stirred at room temperature for 7 hours after which time it is partitioned between water and ethyl acetate and the organic phase separated. This is washed successively with dilute hydrochloric acid, dilute sodium bicarbonate solution, dried and evaporated. The resultant solid is chromatographed on alumina eluting with benzene:ether and pure benzene to give 7α-methyl-17β-acetoxyestra-4,9(10)-dien-3-one.

Example 5

A solution of 1 g. of 7α-methyl-17β-acetoxyestra-4,9(10)-dien-3-one in 50 ml. of methanol is heated at reflux for 3 hours with a solution of potassium hydroxide in 1 ml. of water. The reaction mixture is then poured into ice water and the solid which forms collected by filtration, washed with water to neutrality and dried to yield 7α-methylestra-4,9(10)-dien-17β-ol-3-one which is recrystallized from methylene chloride:ether.

A solution of 6 g. of 7α-methylestra-4,9(10)-dien-17β-ol-3-one in 120 ml. of pyridine is added to a mixture of 6 g. of chromic trioxide in 20 ml. of pyridine. The reaction mixture is allowed to stand at room temperature for 15 hours, diluted with ethyl acetate, and filtered through Celite diatomaceous earth. The filtrate is washed well with water, dried and evaporated to dryness to yield 7α-methylestra-4,9(10)-diene-3,17-dione which may be further purified by recrystallization from acetone:hexane.

The procedures of the immediately preceding five examples may be performed on the corresponding steroids containing an 18-methyl group thus ultimately providing as a reaction product of Example 5, 7α,18-dimethylestra-4,9(10)-diene-3,17-dione, steroids containing an 18-methyl group but void of a 7α-methyl group thus similarly providing as the product 18-methylestra-4,9(10)-diene-3,17-dione, or steroids void of both 7α- and 18-methyl groups giving estra-4,9(10)-diene-3,17-dione. In a like manner, the corresponding 7α-difluoromethylestra-4,9(10)-diene-3,17-dione is prepared by starting with 7α-difluoromethylestr-4-ene-3,17-dione. The other 7-halomethyl compounds hereof are similarly treated to give the corresponding $\Delta^{4,9(10)}$-diene derivatives thereof.

Example 6

A mixture of 2.0 g. of 7α-methylestra-4,9(10)-diene-3,17-dione, 100 ml. of dry benzene, 10 ml. of ethylene glycol and 250 mg. of p-toluenesulfonic acid monohydrate is refluxed under nitrogen for 6 hours. The reaction mixture is then washed with benzene, aqueous sodium bicarbonate solution, and water, dried and evaporated to dryness to yield 3,3;17,17 - bisethylenedioxy-7α-methylestra-5(10),9(11)-diene which is recrystallized from acetone:hexane.

To a solution of 1.75 g. of 3,3;17,17-bisethylenedioxy-7α-methylestra-5(10),9(11)-diene in 5 ml. of methylene chloride is added 1.2 g. of m-chloroperbenzoic acid. The reaction mixture is kept at room temperature for 20 minutes. The mixture is then extracted with methylene chloride, the extracts washed with dilute sodium bicarbonate solution and water, and evaporated to yield an oil.

The oil thus obtained is chromatographed on silica with 1:1 ethyl acetate:hexane and is then dissolved in 4 ml. of dioxane and treated at 25° C. with 0.05 ml. of perchloric acid (70%) for 20 minutes. Isolation via chromatography yields 7α-methylestra - 4,9(10),11-triene-3, 17-dione.

Similar results are obtained when perbenzoic acid is substituted for m-chloroperbenzoic acid in the epoxidation procedure. In like manner, sulfuric acid or other strong acid can be substituted in lieu of perchloric acid in the last procedure with successful results.

The oil obtained upon epoxidation as described above is alternately dissolved in 100 ml. of acetone and to this solution is added 150 mg. of p-toluenesulfonic acid. The mixture is kept at room temperature for 20 hours and is then evaporated to an oily mixture containing the corresponding hydroxy derivatives. These latter derivatives may be isolated via chromatography or the oil may be treated with perchloric acid or other mineral acid as described above to similarly yield 7α-methylestra-4, 9(10),11-triene-3,17-dione.

Likewise prepared by the procedures of this example are 7α,18-dimethylestra - 4,9(10),11-triene - 3,17-dione, 18-methylestra-4,9(10),11-triene - 3,17 - dione and estra-4,9(10),11 - triene - 3,17 - dione. Pregna - 4,9(10),11-triene-3,20-dione may also be thus prepared from pregna-4,9(10) - diene-3,20-dione which is, in turn, prepared from 19-norprogesterone via the procedures set forth hereinbefore. Also thus prepared is 7α-difluoromethyl-estra-4,9(10),11 - triene-3,17 - dione from 7α-difluoromethylestra-4,9(10),11-diene-3,17-dione. The other 7-halomethyl derivatives hereof are similarly treated to give the corresponding $\Delta^{4,9(10),11}$-triene compounds.

Example 7

A mixture of 2 g. of 7α-methylestra-4,9(10)-diene-3,17-dione, 150 ml. of dry benzene, 18 ml. of ethylene glycol, and 40 mg. of oxalic acid monohydrate is refluxed for 18 hours under a nitrogen atmosphere. The reaction mixture is then washed with aqueous sodium bicarbonate solution and water, dried and evaporated to dryness to yield 3,3 - ethylenedioxy-7α-methylestra-4, 9(10)-diene-17-one which is recrystallized from acetone:hexane.

Similarly, 3,3 - ethylenedioxy - 7α - methylestra - 4, 9(10),11-trien-17-one, 3,3 - ethylenedioxyestra - 4,9(10), 11-trien-17-one, 3,3 - ethylenedioxyestra - 7α - difluoromethylestra - 4,9(10)-diene - 17 - one, and 3,3-ethylenedioxyestra - 7α - difluoromethylestra - 4,9(10),11 - trien-17-one are prepared.

Example 8

A solution of 5 g. of 3,3-ethylenedioxy-7α-methylestra-4,9(10)-dien-17-one in 250 ml. of thiophene-free benzene is treated with an equimolar amount of methylmagnesium bromide in anhydrous ether. The mixture is heated at reflux under anhydrous conditions for 3 hours, cooled, and cautiously treated with an excess aqueous ammonium chloride solution. This mixture is then extracted with ethyl acetate and these extracts are in turn washed with water, dried over sodium sulfate and evaporated to dryness to yield 3,3-ethylenedioxy-7α, 17α-dimethylestra-4,9(10)-dien-17β-ol which is recrystallized from methylene chloride:hexane.

A mixture of 0.5 g. of 3,3-ethylenedioxy-7α,17α-dimethylestra-4,9(10)-dien-17β-ol in 25 ml. of acetone and 0.1 ml. of concentrated hydrochloric acid is allowed to stand at room temperature for 15 hours and is then poured into water. This mixture is extracted with methylene chloride and the extracts are in turn washed with water to neutrality, dried over sodium sulfate, and evaporated to dryness, to yield 7α,17α-dimethylestra-4,9(10)-dien-17β-ol-3-one which may be recrystallized from acetone:hexane.

Among other steriods which may be prepared in accordance with the procedure of this example are 17α-methylestra-4,9(10)-dien - 17β - ol - 3 - one, 7α,17α-dimethylestra - 4,9(10) - dien - 17β - ol - 3 - one, 7α,17α-dimethylestra - 4,9(10),11 - trien - 17β-ol-3-one, 17α,18-dimethylestra - 4,9(10),11 - trien - 17β - ol-3-one, 7α-difluoromethyl - 17α - methylestra - 4,9(10) - dien - 17β-ol - 3 - one, and 7α - difluoromethyl-17α-methylestra-4, 9(10),11-trien-17β-ol-3-one.

Example 9

To a solution of 1 g. of 17α-methylestra-4,9(10),11-trien-17β-ol-3-one in 20 ml. of benzene, 20 ml. of dihydrofuran is added. Five milliliters is distilled off to remove moisture, and the mixture is allowed to cool to room temperature. To the cooled mixture, 0.2 g. of freshly purified p-toluenesulfonyl chloride is added. The mixture is stirred at room temperature for 24 hours and then poured into an excess of 5% aqueous sodium bicarbonate solution. The product is extracted with ethyl acetate, the organic solution is washed with water to neutrality, dried over anhydrous magnesium sulfate, and evaporated to dryness under reduced pressure. The oily residue crystallizes on the addition of ether to yield the 17α-methyl - 17β - tetrahydrofuran-2'-yloxyestra-4,9(10), 11-trien-3-one.

Likewise, 7α,17α - dimethyl - 17β - tetrahydrofuran-2' - yloxyestra - 4,9(10) - dien - 3 - one, 7α - difluoromethyl - 17α - methyl - 17β - tetrahydrofuran - 2' - yloxyestra - 4,9(10),11-trien-3-one, 17α,18 - dimethyl - 17β-tetrahydrofuran - 2' - yloxyestra - 4,9(10),11 - trien-3-one, and 17α - ethynyl-17β - tetrahydrofuran - 2'-yloxyestra-4,9(10),11-trien-3-one are prepared.

Example 10

Two milliliters of dihydropyran are added to a solution of 1 g. of 17α-methylestra-4,9(10),11-trien-17β-ol-3-one in 15 ml. of benzene. About 1 ml. is removed by distillation to remove moisture and 0.4 g. of p-toluenesulfonic acid is added to the cooled solution. This mixture is allowed to stand at room temperature for 4 days and is then washed with aqueous sodium carbonate solution and water, dried and evaporated. The residue is chromatographed on neutral alumina, eluting with hexane to yield 17α - methyl - 17β-tetrahydropyran-2'-yloxyestra-4,9 (10),11-trien-3-one which is recrystallized from pentane.

Likewise, 7α-difluoromethyl-17α-methyl-17β-tetrahydropyran - 2' - yloxyestra-4,9(10),11-trien-3-one, 17α,18-dimethyl-17β-tetrahydropyran - 2' - yloxyestra-4,9(10),11-trien-3-one, and 17α-ethynyl-17β-tetrahydropyran-2'-yloxyestra-4,9(10),11-trien-3-one are prepared.

Example 11

To a stirred solution of 2 g. of 3,3-ethylenedioxy-7α-methylestra-4,9(10)-dien-17-one in 250 ml. of absolute ether is added in a dropwise fashion and under nitrogen, an ethereal solution of 10 molar equivalents of ethyl lithium. The mixture is then stirred for 48 hours at room temperature, poured into water, acidified with hydrochloric acid, and stirred vigorously for one hour. The ethereal phase is separated, washed with water to neutrality, dried over sodium sulfate, and evaporated to dryness to yield 3,3-ethylenedioxy-7α-methyl-17α-ethylestra-4,9(10 - dien-17β-ol which is further purified through recrystallization from acetone:hexane.

Hydrolysis with acid according to the procedure set forth in the second paragraph of Example 8 affords 7α-methyl-17α-ethylestra-4,9(10)-dien-17β-ol-3-one.

Among other steroids which may be similarly prepared are 17α - ethyl-18-methylestra-4,9(10)-dien-17β-ol-3-one and 7α,18-dimethyl-17α-ethylestra-4,9(10),11-trien - 17β-ol-3-one, 7α-difluoromethyl-17α-ethylestra-4,9(10) - dien- 17β-ol-3-one, and 7α-difluoromethyl-17α-ethylestra-4,9(10),11-trien-17β-ol-3-one.

Example 12

A solution of 8.5 g. of 1,2-dichloroethylene in 50 ml. of anhydrous ether is added in a dropwise fashion, under nitrogen and at 0° C., over a 30 minute period to a stirred solution of 15 ml. of 1.4 N methyl lithium in anhydrous ether. After stirring for an additional 90 minutes at room temperature, a solution of 0.5 g. of 3,3-ethylenedioxy-7α-methylestra-4,9(10)-dien-17-one in 20 ml. of anhydrous ether is added a dropwise fashion with stirring over a 15 minute period. Stirring at room temperature is continued for 18 hours, and the reaction mixture is then poured into ice water, dried over sodium sulfate, and concentrated under reduced pressure. The residue is chromatographed on alkaline alumina with 8:2 hexane:ether to yield 3,3-ethylenedioxy - 7α - methyl-17α-chloroethynylestra-4,9(10)-dien-17β-ol which may be recrystallized from methanol.

Hydrolysis with acid according to the procedure of the second paragraph of Example 8 yields 7α-methyl-17α-chloroethynylestra-4,9(10)-dien-17β-ol-3-one.

Likewise, 7α - methyl - 17α - chloroethynylestra-4,9(10)11-trien-17β-ol-3-one, 7α-difluoromethyl-17α-chloroethynylestra-4,9(10)-dien-17β-ol-3-one, and 7α-difluoromethyl-17α-chloroethynylestra - 4,9(10),11 - trien-17β-ol-3-one are prepared. 17α-chloroethynylestra-4,9(10),11-trien-17β-ol-3-one and 17α-chloroethynyl-18-methylestra-4,9(10),11-trien-17β-ol-3-one which are similarly prepared are converted respectively to 17α-chloroethynyl-17β - tetrahydrofuran - 2′-yloxyestra-4,9(10),11-trien-3-one, 17α - chloroethynyl - 17β-tetrahydropyran - 2′ - yloxyestra - 4,9(10),11 - trien-3-one, 17α-chloroethynyl-17β-tetrahydrofuran-2′-yloxy-18-methylestra - 4,9(10),11-trien-3-one, and 17α-chloroethynyl-17β-tetrahydropyran-2′-yloxy-18-methylestra-4,9(10),11-trien-3-one by treatment with dihydrofuran and dihydropyran as outlined in the penultimate paragraphs of Examples 9 and 10, respectively.

Example 13

A solution of 1 g. of 3,3-ethylenedioxy-7α-methylestra-4,9(10)-dien-17-one in 3 ml. of anhydrous benzene is added under nitrogen to a solution of 1.4 g. of potassium in 30 ml. of t-amyl alcohol. A slow current of purified acetylene is then passed through the solution for 40 hours. The mixture is diluted with water and extracted with benzene. These extracts are washed with water to neutrality, dried over sodium sulfate, and evaporated. Chromatography of the residue on alkaline alumina with 2:1 hexane:benzene yields 3,3-ethylenedioxy-7α-methyl-17α-ethynylestra-4,9(10)-dien-17β-ol which is recrystallized from acetone:hexane.

Acid hydrolysis by the procedure of the second paragraph of Example 8 yields 7α-methyl-17α-ethynylestra-4,9(10)-dien-17β-ol-3-one.

Among other steroids prepared by the procedure of this example are 7α-methyl-17α-ethynylestra-4,9(10),11-trien - 17β - ol-3 - one, 7α-difluoromethyl-17α-ethynylestra-4,9(10) - dien - 17β-ol-3-one, 7α-difluoromethyl-17α-ethynylestra-4,9(10),11-trien-17β-ol-3-one, 17α-ethynylestra-4,9(10) - dien-17β-ol-3-one, 7α,18-dimethyl-17α-ethynylestra-4,9(10),11-trien-17β-ol-3-one, 17α-ethynylestra-4,9(10),11-trien-17β-ol-3-one, and 17α-ethynyl-18-methylestra-4,9(10),11-trien-17β-ol-3-one.

17α-ethynylestra-4,9(10),11-trien-17β-ol-3-one and 17α-ethynyl-18-methylestra-4,9(10),11-trien-17β-ol-3-one are treated with dihydrofuran and dihydropyran according to the procedures of Examples 9 and 10 to yield 17α-ethynyl-17β-tetrahydrofuran-2′ - yloxyestra - 4,9(10),11-trien-3-one, 17α - ethynyl - 17β - tetrahydropyran-2′-yloxyestra-4,9(10),11-trien-3-one, 17α-ethynyl-17β-tetrahydrofuran-2′-yloxy-18-methylestra-4,9(10),11-trien-3-one and 17α-ethynyl-17β-tetrahydropyran-2′-yloxy-18-methylestra - 4,9(10),11-trien-3-one, respectively.

Example 14

A mixture of 1 g. of 7α-methyl-17α-ethynylestra-4,9(10)-dien-17β-ol-3-one, 1 g. of p-toluenesulfonic acid monohydrate, 50 ml. of acetic acid and 25 ml. of acetic anhydride is allowed to stand at room temperature for 24 hours, and then poured into water and stirred. This mixture is then extracted with methylene chloride and these extracts are dried and evaporated to yield 7α-methyl-17α-ethynyl-17β-acetoxyestra-4,9(10)-dien-3-one which is recrystallized from acetone:ether.

Among other steroids similarly prepared are 7α-difluoromethyl - 17α-ethynyl-17β-acetoxyestra-4,9(10)-dien-3-one, 7α-difluoromethyl-17α-ethynyl-17β-acetoxyestra-4,9(10),11 - trien - 3 - one, 17α-ethynyl-17β-acetoxyestra-4,9(10)-dien-3-one and 7α-methyl-17α-ethynyl-17β-acetoxyestra-4,9(10),11-trien-3-one.

Example 15

A solution of 1 g. of 7α-methyl-17α-ethynylestra-4,9(10)-dien-17β-ol-3-one in 40 ml. of pyridine is hydrogenated at 25° C. atmospheric pressure in the pressure of 0.4 g. of prehydrogenated 2% palladium-on-calcium carbonate. When 1.1 molar equivalents of hydrogen are absorbed, the reaction is stopped. The catalyst is removed by filtration through Celite diatomaceous earth and washed with ethyl acetate and the combined filtrate and washings are evaporated to dryness under reduced pressure. The residue is dissolved in ethyl acetate and this solution is then washed with dilute hydrochloric acid and water to neutrality, dried and evaporated to dryness to yield 7α-methyl-17α-vinylestra-4,9(10)-dien-17β-ol-3-one which is further purified through recrystallization from acetone.

Similarly, 7α-difluoromethyl - 17α - vinylestra - 4,9(10)-dien-17β-ol-3-one, 7α-difluoromethyl - 17α - vinylestra-4,9-(10),11-trien-17β-ol-3-one, 17α-vinylestra - 4,9(10) - dien-17β-ol-3-one, and 7α-methyl - 17α - vinylestra-4,9(10),11-trien-17β-ol-3-one are prepared.

Example 16

A solution of 3 g. of 7α-methyl-17α-ethynylestra-4,9-(10)-dien-17β-ol-3-one in 125 ml. of dioxane is hydrogenated at 25° C./570 mm. with 0.5 g. of prehydrogenated 10% palladium-on-charcoal. Upon the consumption of the theoretical amount of hydrogen, the solution is filtered and the filtrate evaporated to dryness under reduced pressure to yield 7α-methyl-17α-ethylestra-4,9-(10)-dien-17β-ol-3-one which is recrystallized from acetone.

Likewise prepared are 7α-difluoromethyl-17α-ethylestra-4,9(10)-dien-17β-ol-3-one, 7α - difluoromethyl-17α-ethylestra-4,9(10),11-trien-17β-ol-3-one, and 7α-methyl-17α-ethylestra-4,9(10),11-trien-17β-ol-3-one.

Example 17

A mixture of 7 g. of methylene iodide and 3 g. of zinc-copper in 15 ml. of anhydrous ether is heated at reflux under nitrogen for 3 hours. The mixture is then cooled and 2 g. of 7α-methyl-17α-vinylestra-4,9(10)-dien-17β-ol-3-one are added. This mixture is allowed to stand at room temperature for 2 hours and is then poured into 200 ml. of 2% aqueous sodium carbonate and extracted twice with 100 ml. portions of ether. These extracts are dried over sodium sulfate and evaporated under pressure. The residue is held at 0.01 mm. to remove any unreacted methylene iodide and then recrystallized from hexane to yield 7α-methyl-17α-cyclopropylestra-4,9(10)-dien-17β-ol-3-one.

Similarly prepared are 7α-difluoromethyl-17α-cyclopropylestra-4,9(10)-dien-17β-ol-3-one, 7α-difluoromethyl-17α-cyclopropylestra-4,9(10),11 - trien-17β-ol-3-one, and 7α-methyl-17α-cyclopropylestra - 4,9(10),11-trien-17β-ol-3-one.

Example 18

A solution of 1 g. of sodium borohydride in 3 ml. of water is added to an ice-cooled solution of 1 g. of 3,3-ethylenedioxy-7α-methylestra-4,9(10)-dien-17-one in 120 ml. of methanol and the mixture then allowed to stand for 16 hours at room temperature. The excess reagent is decomposed by addition of acetic acid and the solution is then concentrated to a small volume in vacuo and diluted with water. The product is extracted with ethyl acetate and these extracts are washed with water, dried and evaporated to yield 3,3-ethylenedioxy-7α-methylestra-4,9(10)-dien-17β-ol which may be further purified by recrystallization from acetone:hexane.

Hydrolysis with acid according to the procedure of Example 8 (second paragraph) yields 7α-methylestra-4,9(10)-dien-17β-ol-3-one.

7α-difluoromethylestra-4,9(10)-dien-17β-ol-3-one, 7α-difluoromethylestra-4,9(10),11-trien-17β-ol-3-one, 7α-methylestra-4,9(10),11-trien-17β-ol-3-one, estra-4,9(10),11-trien-17β-ol-3-one, and 18-methylestra-4,9(10),11-trien-17β-ol-3-one are similarly prepared.

Example 19

To a solution of 1 g. of 7α-methylestra-4,9(10)-dien-17β-ol-3-one in 20 ml. of benzene, 20 ml. of dihydrofuran are added. Five milliliters is distilled off to remove moisture, and the mixture is allowed to cool to room temperature. To the cooled mixture, 0.2 g. of freshly purified p-toluenesulfonyl chloride is added. The mixture is stirred at room temperature for 24 hours and then poured into an excess of 5% aqueous sodium bicarbonate solution. The product is extracted with ethyl acetate, the organic extracts being washed with water to neutrality, dried over anhydrous magnesium sulfate, and evaporated to dryness under reduced pressure. The oily residue crystallizes on the addition of ether to yield the 7α-methyl-17β-tetrahydrofuran-2'-yloxyestra-4,9(10)-dien-3-one.

Similarly prepared is 7α-difluoromethyl-17β-tetrahydrofuran-2'-yloxyestra-4,9(10)-dien-3-one, 7α-difluoromethyl-17β-tetrahydrofuran-2'-yloxyestra-4,9(10),11-trien-3-one, 7α-methyl-17β-tetrahydrofuran-2'-yloxyestra-4,9(10),11-trien-3-one, 17β-tetrahydrofuran-2'-yloxyestra-4,9(10),11-trien-3-one, and 17β-tetrahydrofuran-2'-yloxy-18-methylestra-4,9(10),11-trien-3-one.

Example 20

Two milliliters of dihydropyran are added to a solution of 1 g. of 7α-methylestra-4,9(10)-dien-17β-ol-3-one in 15 ml. of benzene. About 1 ml. is removed by distillation to remove moisture and 0.4 g. of p-toluenesulfonic acid is added to the cooled solution. This mixture is allowed to stand at room temperature for 4 days, and is then washed with aqueous sodium carbonate solution and water, dried and evaporated. The residue is chromatographed on neutral alumina, eluting with hexane, to yield 7α-methyl-17β-tetrahydropyran-2'-yloxyestra-4,9(10)-dien-3-one which is recrystallized from pentane.

Similarly prepared is 7α-difluoromethyl-17β-tetrahydropyran-2'-yloxyestra-4,9(10)-dien-3-one, 7α-difluoromethyl-17β-tetrahydropyran-2'-yloxyestra-4,9(10),11-trien-3-one, 7α-methyl-17β-tetrahydropyran-2'-yloxyestra-4,9(10),11-trien-3-one, 17β-tetrahydropyran-2'-yloxyestra-4,9(10),11-trien-3-one, and 17β-tetrahydropyran-2'-yloxy-18-methylestra-4,9(10),11-trien-3-one.

Example 21

A mixture of 2 g. of 3,3-ethylenedioxy-7α-methylestra-4,9(10)-dien-17β-ol in 8 ml. of pyridine and 4 ml. of adamantoyl chloride is heated at steam bath temperatures for one hour. The mixture is then poured into ice water and the solid which forms is collected by filtration, washed with water and dried to yield 3,3-ethylenedioxy-7α-methyl-17β-adamantoyloxyestra-4,9(10)-diene which is further purified through recrystallization from methylene chloride:hexane.

Acid hydrolysis following the procedure outlined in the second paragraph of Example 8 affords 7α-methyl-17β-adamantoyloxyestra-4,9(10)-dien-3-one.

Among other steroids similarly prepared are 7α-difluoromethyl-17β-adamantoyloxyestra-4,9(10)-dien-3-one, 7α-difluoromethyl-17β-adamanoyloxyestra-4,9(10),-11-trien-3-one, 17β-adamantoyloxyestra-4,9(10),11-trien-3-one, and 7α-methyl-17β-adamantoyloxyestra-4,9(10),11-trien-3-one.

Example 22

A solution of 1 g. of 3,3-ethylenedioxy-7α-methylestra-4,9(10)-dien-17β-ol in 60 ml. of anhydrous ether is treated with 7.5 molar equivalents of ethylmagnesium bromide in ether and, after a few minutes, with 7.5 molar equivalents of 3-phenylpropionyl chloride. The mixture is allowed to stand at room temperature for 15 hours, then diluted with water, and extracted with methylene chloride. The extracts are washed with water to neutrality, dried and evaporated. The residue is chromatographed on neutral alumina, eluting with ether:hexane, to yield 3,3-ethylenedioxy-7α-methyl-17β-(3-phenylpropionyloxy)estra-4,9(10)-diene which is recrystallized from acetone:hexane.

Acid hydrolysis by the procedure of Example 8 (second paragraph) affords 7α-methyl-17β-(3-phenylpropionyloxy)estra-4,9(10)-dien-3-one.

Also prepared by the procedure of this example are 7α-difluoromethyl-17β-(3-phenylpropionyloxy)estra-4,9-(10),11-trien-3-one.

Example 23

A mixture of 1 g. of 3,3-ethylenedioxy-7α-methylestra-4,9(10)-dien-17β-ol, 4 ml. of pyridine, and 2 ml. of acetic anhydride is allowed to stand at room temperature for 15 hours. The mixture is then poured into ice water and the solid which forms is collected by filtration, washed with water and dried to yield 3,3-ethylenedioxy-7α-methyl-17β-acetoxyestra-4,9(10)-diene which may be further purified through recrystallization from acetone:hexane.

Acid hydrolysis by the procedure of Example 8 (second paragraph) gives 7α-methyl-17β-acetoxyestra-4,9(10)-dien-3-one.

7α-difluoromethyl-17β-acetoxy-4,9(10)-dien-3-one, 7α-difluoromethyl-17β-acetoxy-4,9(10),11-trien-3-one, and 7α-methyl-17β-acetoxyestra-4,9(10),11-trien-3-one are likewise prepared.

Example 24

A solution of 1 g. of 7α-methyl-17α-ethynylestra-4,9-(10)-dien-17β-ol-3-one in 50 ml. of tetrahydrofuran is added over a 30 minute period to a stirred suspension of 1 g. of lithium aluminum hydride in 50 ml. of anhydrous tetrahydrofuran and this mixture is heated at reflux for 2 hours. To the mixture are cautiously added 5 ml. of ethyl acetate and 1 ml. of water. Sodium sulfate is next added, the mixture is filtered and the solid thus collected is washed with hot ethyl acetate. The combined organic solutions are then evaporated to yield 7α-methyl-17α-ethynyl-4,9(10)-diene-3β,17β-diol which may be further purified through recrystallization from acetone:hexane.

To a solution of 7α-methyl-17α-ethynylestra-4,9(10)-diene-3β,17β-diol in 20 ml. of benzene, 20 ml. of dihydrofuran is added. Five milliliters is distilled off to remove moisture, and the mixture is allowed to cool to room temperature. To the cooled mixture, 0.2 g. of freshly purified p-toluenesulfonyl chloride is added. The mixture is stirred at room temperature for 24 hours and then poured into an excess of 5% aqueous sodium bicarbonate solution. The product is extracted with ethyl acetate, the organic solution is washed with water to neutrality, dried over anhydrous magnesium sulfate, and evaporated to dryness under reduced pressure. The oily residue crystallizes on the addition of ether to yield the 3β-tetrahydrofuran-2'-yloxy-7α-methyl-17α-ethynylestra-4,9(10)-dien-17β-ol.

Example 25

By following the procedures outlined in Example 24, with the starting steroids listed under I below, the corresponding products listed under II below are obtained.

I

7α,17α-dimethylestra-4,9(10),11-trien-17β-ol-3-one,
7α-methyl-17α-ethylestra-4,9(10)-dien-17β-ol-3-one,
7α-methyl-17α-ethynylestra-4,9(10)-dien-17β-ol-3-one,
7α-methyl-17α-ethynylestra-4,9(10),11-trien-17β-ol-3-one,
7α-18-dimethyl-17α-ethylestra-4,9(10)-dien-17β-3-one,
7α-methyl-7α-ethynyl-17β-acetoxyestra-4,9(10),11-trien-3-one,
7α,17α-dimethyl-17β-tetrahydrofuran-2′-yloxyestra-4,9(10)-dien-3-one,
7α-methyl-17α-ethynyl-17β-tetrahydrofuran-2′-yloxyestra-4,9(10),11-trien-3-one,
7α-methyl-17α-ethynyl-17β-tetrahydropyran-2′-yloxyestra-4,9(10),11-trien-3-one,
7α-methyl-17β-adamantoyloxyestra-4,9(10)-dien-3-one,
7α-methyl-17α-chloroethynylestra-4,9(10)-dien-17β-ol-3-one,
7α-difluoromethylestra-4,9(10)-dien-17β-ol-3-one,
7α-difluoromethylestra-4,9(10)-dien-17β-ol-3-one,
7α-difluoromethyl-17β-acetoxyestra-4,9(10),11-trien-3-one,
7α-difluoromethyl-17α-methylestra-4,9(10),11-trien-17β-ol-3-one,
7α-difluoromethyl-17α-ethynyl-17β-acetoxyestra-4,9(10)-dien-3-one,
7α-difluoromethyl-17α-ethynylestra-4,9(10),11-trien-17β-ol-3-one,
7α-difluoromethyl-18-methyl-17β-tetrahydrofuran-2′-yloxyestra-4,9(10)-dien-3-one,
7α-difluoromethyl-17α-ethynyl-17β-tetrahydropyran-2′-yloxyestra-4,9(10)-dien-3-one,
17α-methylestra-4,9(10)-dien-17β-ol-3-one,
17α-ethyl-18-methylestra-4,9(10),11-trien-17β-ol-3-one,
17α-vinylestra-4,9(10)-dien-17β-ol-3-one,
17β-tetrahydrofuran-2′-yloxyestra-4,9(10),11-trien-3-one,
17β-tetrahydropyran-2′-yloxyestra-4,9(10),11-trien-3-one,
17β-adamantoyloxyestra-4,9(10),11-trien-3-one,
7α-methyl-17β-(3-phenylpropionyloxy)estra-4,9(10),11-trien-3-one,
17α-methyl-17β-tetrahydrofuran-2′-yloxyestra-4,9(10),11-trien-3-one,
17α-methyl-17β-tetrahydropyran-2′-yloxyestra-4,9(10),11-trien-3-one,
17α-ethynyl-17β-tetrahydrofuran-2′-yloxyestra-4,9(10),11-trien-3-one, and
17α-ethylnyl-17β-tetrahydropyran-2′-yloxyestra-4,9(10),11-trien-3-one.

II

3β-tetrahydrofuran-2′-yloxy-7α,17α-dimethylestra-4,9(10)-dien-17β-ol,
3β-tetrahydrofuran-2′-yloxy-7α,17α-dimethylestra-4,9(10),11-trien-17β-ol,
3β-tetrahydrofuran-2′-yloxy-7α-methyl-17α-ethylestra-4,9(10)-dien-17β-ol,
3β-tetrahydrofuran-2′-yloxy-7α-methyl-17α-ethynylestra-4,9(10)-dien-17β-ol,
3β-tetrahydrofuran-2′-yloxy-7α-methyl-17α-ethynylestra-4,9(10),11-trien-17β-ol,
3β-tetrahydrofuran-2′-yloxy-7α,18-dimethyl-17α-ethylestra-4,9(10)-dien-17β-ol,
3β-tetrahydrofuran-2′-yloxy-7α-methyl-17α-ethynyl-17β-acetoxy-estra-4,9(10),11-triene,
3β,17β-bistetrahydrofuran-2′-yloxy-7α,17α-dimethylestra-4,9(10)-diene,
3β,17β-bistetrahydrofuran-2′-yloxy-7α-methyl-17α-ethynylestra-4,9(10),11-triene,
3β-tetrahydrofuran-2′-yloxy-7α-methyl-17α-ethynyl-17β-tetrahydropyran-2′-yloxyestra-4,9(10),11-triene,
3β-tetrahydrofuran-2′-xyloxy-7α-methyl-17β-adamantoyloxyestra-4,9(10)-diene,
3β-tetrahydrofuran-2′-yloxy-7α-methyl-17α-chloroethynylestra-4,9(10)-dien-17β-ol,
3β-tetrahydrofuran-2′-yloxy-7α-difluoromethylestra-4,9(10)-dien-17β-ol,
3β-tetrahydrofuran-2′-yloxy-7α-difluoromethylestra-4,9(10),11-trien-17β-ol,
3β-tetrahydrofuran-2′-yloxy-7α-difluoromethyl-17β-acetoxyestra-4,9(10),11-triene,
3β-tetrahydrofuran-2′-yloxy-7α-difluoromethyl-17α-methylestra-4,9(10),11-trien-17β-ol,
3β-tetrahydrofuran-2′yloxy-7α-difluoromethyl-17α-ethynyl-17β-acetoxyestra-4,9(10)-diene,
3β-tetrahydrofuran-2′yloxy-7α-difluoromethyl-17α-ethynylestra-4,9(10),11-trien-17β-ol,
3β,17β-bistetrahydrofuran-2′-yloxy-7α-difluoromethyl-18-methyl-estra-4,9(10)-diene,
3β-tetrahydrofuran-2′-yloxy-7α-difluoromethyl-17α-ethynyl-17β-tetrahydropyran-2′-yloxyestra-4,9(10)-diene,
3β-tetrahydrofuran-2′-yloxy-17α-methylestra-4,9(10)-dien-17β-ol,
3β-tetrahydrofuran-2′-yloxy-17α-ethyl-18-methylestra-4,9(10),11-trien-17β-ol,
3β-tetrahydrofuran-2′-yloxy-17α-vinylestra-4,9(10)-dien-17β-ol,
3β,17β-bistetrahydrofuran-2′-yloxyestra-4,9(10),11-triene,
3β-tetrahydrofuran-2′-yloxy-17β-tetrahydropyran-2′-yloxyestra-4,9(10),11-triene,
3β-tetrahydrofuran-2′-yloxy-17β-adamantoyloxyestra-4,9(10),11-triene,
3β-tetrahydrofuran-2′-yloxy-7α-methyl-17β-(3-phenylpropionyloxy)-estra-4,9(10),11-triene,
3β,17β-bistetrahydrofuran-2′-yloxy-17α-methylestra-4,9(10),11-triene,
3β-tetrahydrofuran-2′-yloxy-17β-tetrahydropyran-2′-yloxy-17α-methylestra-4,9(10),11-triene,
3β,17β-bistetrahydrofuran-2′-yloxy-17α-ethnylestra-4,9(10),11-triene, and
3β-tetrahydrofuran-2′-yloxy-17β-tetrahydropyran-2′-yloxy-17α-ethynylestra,4,9(10),11-triene.

Example 26

Two milliliters of dihydropyran are added to a solution of 1 g. of 7α-methyl-17α-ethynylestra-4,9(10)-diene-3β,17β-diol in 15 ml. of benzene. About 1 ml. is removed by distillation to remove moisture and 0.4 g. of p-toluenesulfonyl chloride is added to the cooled solution. This mixture is allowed to stand at room temperature for four days and is then washed with an aqueous sodium bicarbonate solution and water, dried and evaporated. The residue is chromatographed on neutral alumina, eluting with hexane to yield 3β-tetrahydropyran-2′-yloxy-7α-methyl-17α-ethynylestra-4,9(10)-dien-17β-ol which is recrystallized from pentane.

Example 27

By following the procedures outlined in the first paragraph of Example 24 and in Example 26, with the starting steroids listed under I in Example 25, the corresponding products containing the 3β-tetrahydropyran-2′-yloxy group in lieu of the 3-keto group thereof are obtained in each instance.

As has been illustrated in other instances hereinbefore, steroids containing an 18-methyl group with or without a 7α-methyl group and steroids void of both 7α- and 18-methyl groups as well as steroids containing only the 7α-methyl, as has been depicted in the above examples, may be employed in each of Examples 9 through 26, thus ultimately providing as a product of Example 24 a 3β-tetrahydrofuran-2′-yloxy derivative and of Example 26 a 3β-tetrahydropyran-2′-yloxy derivative of a steroid appropriately substituted at C-17 selected from 7α-methyl steroids, 7α,18-dimethyl steroids, 18-methyl steroids, and steroids void of methyl groups at C-7 and C-18.

It will be understood that the lists of product compounds set forth in Example 25 and outlined in Example 27 are merely illustrative and any of the derivatives prepared via the procedures set forth in the foregoing examples are, when so treated, converted to the respective 3β - tetrahydrofuran-2'-yloxy and 3β - tetrahydropyran-2'-yloxy compounds.

The requisite starting compounds of this invention may be prepared as follows.

Example 28

A mixture of 1 g. of estr-4-en-17β-ol-3-one, 2 g. of chloranil, 15 ml. of ethyl acetate and 5 ml. of acetic acid is refluxed under nitrogen for 96 hours. The mixture is then cooled and washed with cold 10% aqueous sodium hydroxide until the washings are colorless. The organic solution is dried over sodium sulfate and the ethyl acetate removed by evaporation. Upon chromatography of the residue on neutral alumina there is obtained estra-4,6-dien-17β-ol-3-one which may be further purified by recrystallization from acetone:hexane.

To 10 ml. of 3 M ethereal methylmagnesium bromide in 20 ml. of tetrahydrofuran, cooled in an ice bath and stirred under nitrogen are added 0.16 g. of cuprous chloride and a solution of 1 g. of estra-4,6-dien-17β-ol-3-one in 13 ml. of tetrahydrofuran. The ice bath is then removed and the mixture is stirred at room temperature for 25 minutes and poured into a mixture of ether, ice and dilute hydrochloric acid which has been saturated with sodium chloride. The ethereal phase is separated and washed sequentially with dilute hydrochloric acid, saturated aqueous sodium chloride solution, dilute sodium hydroxide solution and saturated sodium chloride solution. These extracts are back extracted with ether and the combined ethereal extracts are dried over magnesium sulfate and evaporated. The residue is chromatographed on Florosil absorbent to yield 7α-methylestr-4-en-17β-ol-3-one. To a stirred solution of 1 g. of 7α-methylestr-4-en-17β-ol-3-one in 10 ml. of acetone, cooled to 0° C., is added under nitrogen a solution of 8 N chromic acid (prepared by mixing 26 g. of chromium trioxide with 23 ml. of concentrated sulfuric acid and diluting with water to 100 ml.) until the color of the reagent persists in the mixture. The mixture is then stirred for 5 minutes at 0–5° C. and diluted with water. The solid which forms is collected by filtration, washed with water and dried under vacuum to yield 7α-methylestr-4-ene-3,17-dione which may be further purified by recrystallization from acetone:hexane.

In a similar manner as described in this example, 7α,18-dimethylestr-4-ene-3,17-dione is prepared from 18-methylestr-4-en-17β-ol-3-one. Likewise, by practicing the oxidation procedure described in the preceding paragraph on estr-4-en-17β-ol-3-one and 18-methylestr-4-en-17β-ol-3-one there are respectively obtained estr-4-ene-3,17-dione and 18-methylestr-4-ene-3,17-dione.

To a refluxing solution of 1 g. of androsta-4,6-dien-17β-ol-3-one in 10 ml. of dimethyl diethylene glycol ether is added over a two-hour period in a dropwise fashion with stirring, a solution of 35 equivalents of sodium chlorodifluoroacetate, in 40 ml. of dimethyl diethylene glycol ether. The mixture is refluxed until the U.V. spectra indicates the disappearance of the 3-keto-Δ$^{4,6}$-diene system and is then filtered. The filtrate is evaporated to dryness and the residue is briefly refluxed with 10 ml. of 1.33 N sodium methoxide in methanol. After neutralization with acetic acid, the mixture is diluted with methylene chloride and washed with water. The organic solution is then dried over sodium sulfate and evaporated to dryness. The residue is chromatographed on alumina, eluting with methylene chloride to yield 6α,7α-difluoromethyleneandrost-17β-ol-4-en-3-one.

In a similar fashion, there is obtained from estra-4,6-dien-17β-ol-3-one via the procedure of this example, 6α,7α-difluoromethyleneestr-4-en-17β-ol-3-one. Similarly, 6α,7α-difluoromethyleneestr-4-en-3,17-dione and 6α,7α-difluoromethyleneandrost-4-ene-3,17-dione are prepared from estra-4,6-diene-3,17-dione and androsta-4,6-diene-3,17-dione, respectively.

A stirred solution of 1.6 g. of 6α,7α-difluoromethyleneestr-4-ene-3,17-dione in 25 ml. of acetic acid is heated at reflux for 1 hour with five portions of 500 mg. each of zinc dust. The mixture is then stirred at room temperature for 1 hour, filtered, the residue being washed with acetic acid, and diluted with 10 ml. of water. This mixture is extracted with methylene chloride and the methylene chloride extracts are in turn washed with water, 2 N sodium bicarbonate solution, and water. After drying this organic solution with magnesium sulfate, it is evaporated to dryness and chromatographed on alumina with hexane:methylene chloride followed by methylene chloride:ethyl acetate to yield 7α-difluoromethylestr-4-ene-3,17-dione.

In a manner similar to the procedure of this example, 7α-difluoromethylandrost-4-ene-3,17-dione, 7α - difluoromethylestr-4-en-17β-ol - 3 - one and 7α-difluoromethylandrost-4-en-17β-ol-3-one are prepared.

In a similar manner, the other 7-halomethyl compounds hereof are prepared. Thus, by employing sodium trichloroacetate and sodium chlorofluoroacetate in lieu of sodium chlorodifluoroacetate, the corresponding 7α-dichloromethyl and 7α-fluoromethyl derivatives are respectively obtained. Similarly, in lieu of the use of zinc dust in acetic acid in the subsequent procedure, the use of zinc-copper couple in ethanol and n-propanol or zinc dust in tetrahydrofuran affords similar results.

Another method by which the Δ$^{4,9(10),11}$-triene functional grouping is introduced, alternatively to the procedure set forth in Example 6, is as follows.

Example 29

A mixture of 0.5 g. of 7α-methyl-17β-acetoxyestra-4,9(10)-dien-3-one in 25 ml. of methanol is saturated with dry hydrogen chloride gas and allowed to stand at room temperature for 15 hours and is then poured into water. This mixture is extracted with methylene chloride and the extracts are in turn washed with water to neutrality, dried over sodium sulfate, and evaporated to dryness to yield 3,3-dimethoxy - 7α - methyl - 17β - acetoxyestra-5(10),9(11)-diene which may be recrystallized from acetone:hexane.

A solution of 2.0 g. of 3,3-dimethoxy-7α-methyl-17β-acetoxyestra-5(10),9(11)-diene in 70 ml. of acetone and 7 ml. of 8 percent aqueous sulfuric acid is allowed to stand at room temperature for 15 hours, neutralized with a saturated aqueous sodium carbonate solution, concentrated under reduced pressure to about 20 ml., and poured into water. The solid which forms is collected by filtration, washed well with water, and dried to yield 7α-methyl-17β-acetoxyestra-5(10),9(11) - dien - 3 - one which may be recrystallized from acetone.

A solution of 0.5 g. of 7α-methyl-17β-acetoxyestra-5(10),9(11)-dien-3-one in 12.5 ml. of pyridine is stirred at room temperature for 3 days. Evaporation of solvent leaves a solid residue to which, in 20 ml. of methanol and 10 ml. of acetic acid, is added 1.0 gram of sodium iodide. The mixture is allowed to stand at room temperature for 30 minutes. Aqueous sodium thiosulfate is added followed by water and the mixture is extracted with methylene chloride to yield 7α-methyl-17β-acetoxyestra-4,9(10)-dien-11β-ol-3-one which is further purified by crystallization from acetone:hexane.

One gram of 7α-methyl-17β-acetoxyestra-4,9(10)-dien-11β-ol-3-one is dissolved with slow heating in 12.5 ml. of dimethylformamide. To the cooled mixture is then added 0.42 g. of methanesulfonyl chloride and 0.5 ml. of pyridine. After heating the reaction mixture at 8° C. for 30 minutes, it is cooled, diluted with water, and extracted with ethyl acetate. The extracts are washed with water, dried over sodium sulfate and evaporated to yield 7α-methyl-17β-acetoxyestra-4,9(10),11-trien-3-one which may be further purified by recrystallization from acetone: hexane.

7α - methyl - 17β - acetoxyestra - 4,9(10),11 - trien-3-one is hydrolyzed with potassium hydroxide and subsequently oxidized with chromic trioxide both according to the procedures set forth in Example 5, supra., thus giving 7α-methylestra-4,9(10),11-triene-3,17-dione.

The procedures thus illustrated in Example 29 can likewise be performed on steroids containing a 18-methyl group thus ultimately affording as a final product 7α,18-dimethylestra-4,9(10),11-triene-3,17-dione or steroids not containing the 7α-methyl group with or without the presence of a 18-methyl thus similarly ultimately providing 18-methylestra - 4,9(10),11 - triene-3,17-dione and estra - 4,9(10),11 - triene-3,17-dione, respectively, all of which being identical to the products obtained via the procedure of Example 6. Also thus prepared is 7α-difluoromethylestra - 4,9(10),11 - triene - 3,17 - dione from 7α-difluoromethylestra-4,9(10)-diene-3,17-dione. The other 7-halomethyl derivatives hereof are similarly treated to give the corresponding Δ⁴,⁹(¹⁰),¹¹-triene compounds.

Alternatively to the procedures set forth in paragraph 2 of Example 6 can be used the following procedure.

A solution of 7.3 g. of 3,3;17,17-bisethylenedioxy-7α-methylestra-5(10),9(11)-diene in 50 ml. of benzene is allowed to stand at room temperature for 6 days with 5.0 g. of osmium tetroxide. The mixture is then saturated with hydrogen sulfide and then filtered. The filtrate is evaporated to dryness and dissolved in 50 ml. of methanol, the methanolic solution thus prepared is stirred for 20 minutes with 10 g. of neutral alumina and 2 g. of carbon and filtered. The filtrate is evaporated to an oil.

The oil obtained from the osmium tetroxide treatment just described, is further treated with acid according to the procedure set forth in the fifth paragraph of Example 6 to similarly yield 7α-methylestra-4,9(10),11-triene-3,17-dione.

In a like manner, the other Δ⁴,⁹(¹⁰),¹¹-triene compounds contemplated herein are prepared.

What is claimed is:
1. Compounds of the formula

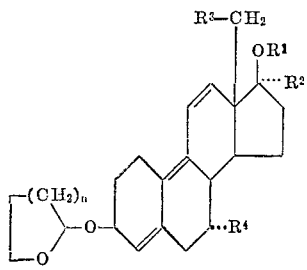

wherein:
$R^1$ is hydrogen, tetrahydrofuran-2-yl, tetrahydropyran-2-yl, or a hydrocarbon carboxylic acyl group of less than 12 carbon atoms;
$R^2$ is hydrogen, cyclopropyl, (lower)alkyl, (lower)alkenyl, (lower)alkynyl, or halo(lower)alkynyl;
$R^3$ is hydrogen or methyl;
$R^4$ is hydrogen or methyl; and
n is the integer 1 or 2.

2. A compound according to claim 1 wherein $R^1$ is hydrogen, $R^2$ is methyl, $R^3$ is hydrogen, $R^4$ is hydrogen, and n is the integer 1 or 2.

3. A compound according to claim 1 wherein $R^1$ is hydrogen, $R^2$ is ethynyl, $R^3$ is hydrogen, $R^4$ is hydrogen, and n is the integer 1 or 2.

4. A compound according to claim 1 wherein $R^1$ is acetyl, $R^2$ is ethynyl, $R^3$ is hydrogen, $R^4$ is methyl, and n is the integer 1 or 2.

5. Compounds of the formula

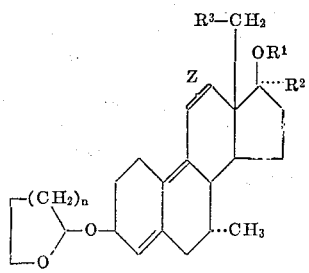

wherein:
$R^1$ is hydrogen, tetrahydrofuran-2-yl, tetrahydropyran-2-yl, or a hydrocarbon carboxylic acyl group of less than 12 carbon atoms;
$R^2$ is hydrogen, cyclopropyl, (lower)alkyl, (lower)alkenyl, (lower)alkynyl, or halo(lower)alkynyl;
$R^3$ is hydrogen or methyl;
Z is a carbon-carbon single bond or a carbon-carbon double bond; and
n is the integer 1 or 2.

6. A compound according to claim 5 wherein $R^1$ is hydrogen, $R^2$ is ethynyl, $R^3$ is hydrogen, Z is a carbon-carbon single bond, and n is the integer 1 or 2.

7. Compounds of the formula

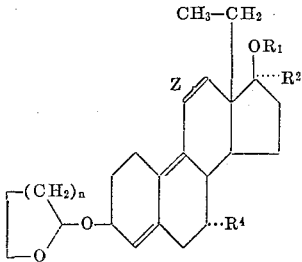

wherein:
$R^1$ is hydrogen, tetrahydrofuran-2-yl, tetrahydropyran-2-yl, or a hydrocarbon carboxylic acyl group of less than 12 carbon atoms;
$R^2$ is hydrogen, cyclopropyl, (lower)alkyl, (lower)alkenyl, (lower)alkynyl, or halo(lower)alkynyl;
$R^4$ is hydrogen or methyl;
Z is a carbon-carbon single bond or a carbon-carbon double bond; and
n is the integer 1 or 2.

8. A compound according to claim 7 wherein $R^1$ is hydrogen, $R^2$ is ethyl, $R^4$ is methyl, Z is a carbon-carbon double bond, and n is the integer 1 or 2.

9. Compounds of the formula

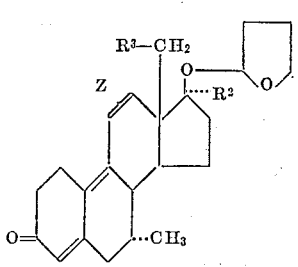

wherein:
$R^2$ is hydrogen, cyclopropyl, (lower)alkyl, (lower)alkenyl, (lower)alkynyl, or halo(lower)alkynyl;
$R^3$ is hydrogen or methyl; and
Z is a carbon-carbon single bond or a carbon-carbon double bond.

10. The compound 7α,17α-dimethyl - 17β - tetrahydrofuran-2'-yloxyestra-4,9(10)-diene-3-one.

11. A process of preparing a 3-keto-Δ⁴,⁹(¹⁰),¹¹-triene steroid which comprises ketalizing a 3-keto-Δ⁴,⁹(¹⁰)-diene steroid to form a 3-ketal-Δ⁵(¹⁰),⁹(¹¹)-diene, epoxidizing this ketal diene with a peroxyacid, and treating the epoxidized product with strong acid.

12. The process of claim 11 wherein the peroxyacid is m-chloroperbenzoic acid and the strong acid is perchloric acid.

13. The process of claim 11 wherein an estra-4,9(10),11-triene is prepared from an estra-4,9(10)-diene.

14. The process of claim 11 wherein the epoxidized product is hydrolyzed with acid in the presence of a ketone to effect epoxide cleavage and ketal hydrolysis, and thereafter treating the hydrolyzed product with a strong acid.

15. The process of claim 14 wherein the hydrolysis acid is p-toluenesulfonic acid.

16. The process of claim 14 wherein an estra-4,9(10),11-triene is prepared from an estra-4,9(10)-diene.

References Cited

UNITED STATES PATENTS

| | | | |
|---|---|---|---|
| 3,341,527 | 9/1967 | Cross | 260—239.55 |
| 3,357,975 | 12/1967 | Beard et al. | 260—239.55 |
| 3,069,421 | 12/1962 | Nominé et al. | 260—239.5 |
| 3,086,027 | 4/1963 | Perelman et al. | 260—397. |
| 3,134,771 | 5/1964 | de Ruggieri et al. | 260—239.5 |
| 3,213,086 | 10/1965 | Cross | 260—239.5 |
| 3,248,294 | 4/1966 | Nominé et al. | 167—7 |
| 3,250,793 | 5/1966 | Fried | 260—397. |
| 3,257,278 | 6/1966 | Nominé et al. | 167—7 |
| 3,290,297 | 12/1966 | Cross | 260—239.5 |

OTHER REFERENCES

Campbell et al., Steroids 1:3, pp. 317–323 (1963).

Fried et al., J. Amer. Chem. Soc. 83, pp. 4663–4664 (1961).

Roussel–UCLAF, S.A., Chem. Abs. 60, 3039h (1964)

Smith et al., J. Chem. Soc. 1964, pp. 4472–4492 (pages 4476, 4478, 4481, 4490, and 4491 relied on).

Velluz et al., Chem. Abs. 59, 12859d (1963).

LEWIS GOTTS, Primary Examiner

E. G. LOVE, Assistant Examiner

U.S. Cl. X.R.

260—397, 999

UNITED STATES PATENT OFFICE
CERTIFICATE OF CORRECTION

Patent No. 3,461,118                    Dated   August 12, 1969

Inventor(s)  John A. Edwards            PAGE - 1

It is certified that error appears in the above-identified patent and that said Letters Patent are hereby corrected as shown below:

Column 1, lines 35 through 55, the second formula from the top should appear as follows:

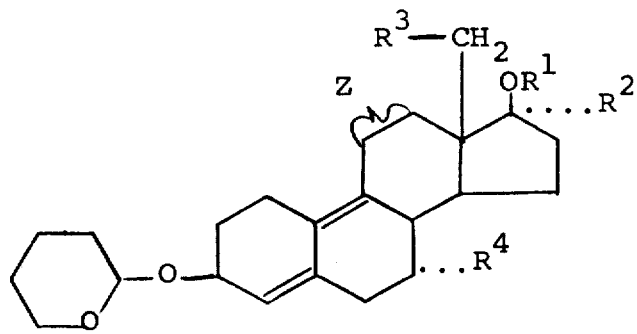

(B)

Column 4, line 57, "soduim" should read --sodium

Column 6, lines 15 through 50, the formulas designated (V-b) and (V-c) should appear as follows:

cont.

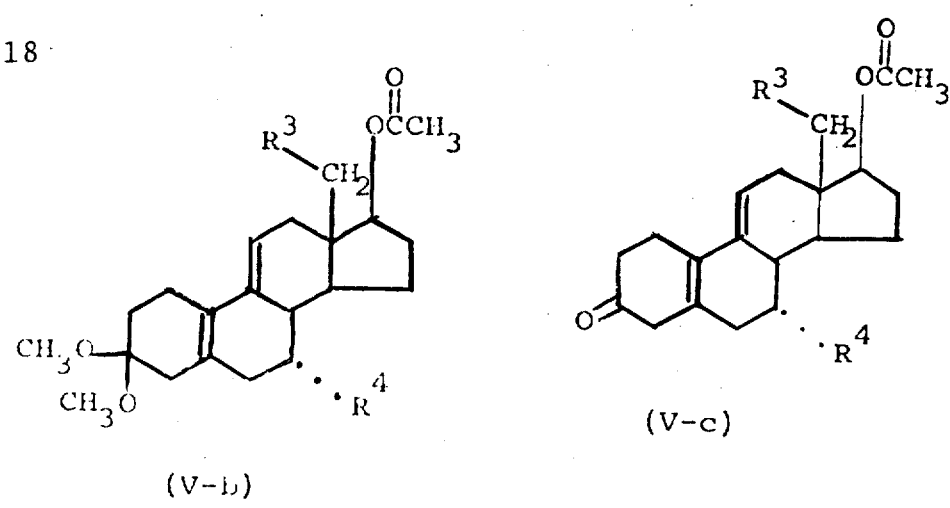

Column 7, lines 4 and 5, cancel "hydroxy compound, unsubstitut in the 17α-". Column 12, line 24, "pressure", second occurrence, should read -- presence --.

Signed and sealed this 4th day of August 1970.

(SEAL)
Attest:

EDWARD M. FLETCHER, JR.
Attesting Officer

WILLIAM E. SCHUYLER, JR
Commissioner of Patents